United States Patent
Mahdi

(10) Patent No.: US 8,634,381 B2
(45) Date of Patent: Jan. 21, 2014

(54) SESSION TRANSFER BETWEEN DIFFERENT ACCESS NETWORK TYPES

(75) Inventor: Kaniz Mahdi, Carrollton, TX (US)

(73) Assignee: Genband US LLC, Plano, TX (US)

( * ) Notice: Subject to any disclaimer, the term of this patent is extended or adjusted under 35 U.S.C. 154(b) by 137 days.

(21) Appl. No.: 12/989,168

(22) PCT Filed: Apr. 22, 2009

(86) PCT No.: PCT/US2009/041431
§ 371 (c)(1),
(2), (4) Date: May 4, 2011

(87) PCT Pub. No.: WO2009/132122
PCT Pub. Date: Oct. 29, 2009

(65) Prior Publication Data
US 2011/0211525 A1   Sep. 1, 2011

Related U.S. Application Data

(60) Provisional application No. 61/046,928, filed on Apr. 22, 2008.

(51) Int. Cl.
*H04W 4/00* (2009.01)
*H04L 12/66* (2006.01)
*H04W 36/00* (2009.01)
*H04M 7/00* (2006.01)

(52) U.S. Cl.
CPC .......... *H04W 36/0011* (2013.01); *H04M 7/006* (2013.01)
USPC ............................. 370/331; 370/352; 455/436

(58) Field of Classification Search
USPC ................. 370/331–334, 351, 352, 357, 389; 455/436–444
See application file for complete search history.

(56) References Cited

U.S. PATENT DOCUMENTS

| | | |
|---|---|---|
| 2007/0121608 A1 | 5/2007 | Gu et al. |
| 2008/0020776 A1 | 1/2008 | Deshpande et al. |
| 2008/0026752 A1 | 1/2008 | Flore et al. |
| 2009/0034472 A1* | 2/2009 | Purnadi et al. ................. 370/331 |
| 2009/0086674 A1* | 4/2009 | Ejzak ............................. 370/331 |
| 2010/0260105 A1* | 10/2010 | Keller et al. ................... 370/328 |

FOREIGN PATENT DOCUMENTS

| | | |
|---|---|---|
| KR | 10-2008-0018756 A | 2/2008 |
| WO | WO 2009/108897 A1 | 9/2009 |

OTHER PUBLICATIONS

Alcatel-Lucent et al., "Migration of VCC Domain Transfer Procedures after Drafting", Apr. 11, 2008, 3GPP TSG SA WG2, Meeting #64, TD S2-083055, pp. 1-3.*

LG Electronics et al., "Definitions for IMS Service Continuity TS", Apr. 11, 2008, 3GPP TSG SA WG2, Meeting #64, TD S2-082799, pp. 1-6.*

(Continued)

*Primary Examiner* — Paul H Masur
(74) *Attorney, Agent, or Firm* — Haynes and Boone, LLP

(57) ABSTRACT

A request is originated by a mobile station, wherein the request contains information relating to both packet-switched communication and circuit-switched communication of data in a session. The request is originated by the mobile station in response to detecting that a transfer is to be performed from a source packet-switched access network to a target network in which different parts of the session is to be communicated in the packet-switched domain and circuit-switched domain. The transfer is completed using the information in the first request.

8 Claims, 2 Drawing Sheets

(56) References Cited

OTHER PUBLICATIONS

Nortel et al., "ICS UE Terminations with CS media information flows using the Gm reference point", Apr. 11, 2008, 3GPP TSG SA WG2, Meeting #64, TD S2-082761, pp. 1-7.*

3GPP TS23.237 v.8.0.0., IP Multimedia Subsystem (IMS) Service Continuity (Jun. 2008).

International Search Report for International Application No. PCT/US2009/041431 (Dec. 4, 2009).

Internation Preliminary Report on Patentability for International Application No. PCT/US2009/041431 (Nov. 4, 2010).

3rd Generation Partnership Project, "Technical Specification Group Services and System Aspects; IP Multimedia Subsystem (IMS) Centralized Services; Stage 2; Release 9," 3GPP TS 23.292 v9.7.0 (Sep. 2010).

3rd Generation Partnership Project, "Technical Specification Group Services and Architecture; Feasible Study on Multimedia Session Continuity; Stage 2; Release 8," 3GPP TR 23.893, v8.0.0 (Jun. 2008).

3GPP SA WG2 Meeting #65, "PS-CS and CS-PS Access Transfers Using Gm Reference Point," Prague, Czech Republic (2008).

Rosenberg at al., "SIP: Session Initiation Protocol," Network Working Group, RFC 3261 (Jun. 2002).

* cited by examiner

SESSION TRANSFER BETWEEN DIFFERENT ACCESS NETWORK TYPES

CROSS REFERENCE TO RELATED APPLICATIONS

This application is a United States national phase of co-pending international patent application No. PCT/US2009/041431, filed Apr. 22, 2009 which claims benefit of U.S. provisional application No. 61/046,928, filed Apr. 22. 2008.

TECHNICAL FIELD

The invention relates to session transfers between different network types.

BACKGROUND

Many types of communications can be performed over data networks (wireless and/or wireline networks), including electronic mail, web browsing, file downloads, electronic commerce transactions, voice or other forms of real time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet Protocol (IP) multimedia subsystem (IMS) protocol that includes various control functions for provision of IP multimedia services, including audio, video, text, chat, or any combination of the foregoing.

An IP multimedia subsystem can be used in conjunction with wireless access networks, such as a wireless access network according to the GSM (Global System for Mobile) or UMTS (Universal Mobile Telecommunications System) standard, as defined by 3GPP, a wireless access network according to the CDMA 2000 (Code Division Multiple Access 2000) standard, as defined by 3GPP2; or other type of wireless access networks.

As a mobile station moves about one or more communications networks, handovers have to be performed as the mobile station moves between different coverage areas served by different base stations or even different access networks. Potentially, the mobile station can move between different types of packet-switched access networks, or between a packet-switched access network and a circuit-switched access network.

In the context of a multimedia communications session (in which both voice data and non-real time data can be communicated, for example), the mobile station can be transferred to a session in which different parts of the multimedia communications are provided over different types of access networks. For example, the transfer may result in voice data being communicated over a circuit-switched access network, while the non-real time data is communicated over a packet-switched access network. Conventional techniques of performing transfers of mobile stations in the above context may not be efficient under certain scenarios.

SUMMARY

A request is originated by a mobile station, wherein the request contains information relating to both packet-switched communication and circuit-switched communication of data in a session. The request is originated by the mobile station in response to detecting that a transfer is to be performed from a source packet-switched access network to a target network in which different parts of the session is to be communicated in the packet-switched domain and circuit-switched domain. The transfer is completed using the information in the first request.

Other or alternative features will become apparent from the following description, from the drawings, and from the claims.

DETAILED DESCRIPTION OF THE PREFERRED EMBODIMENTS

Figure 1:
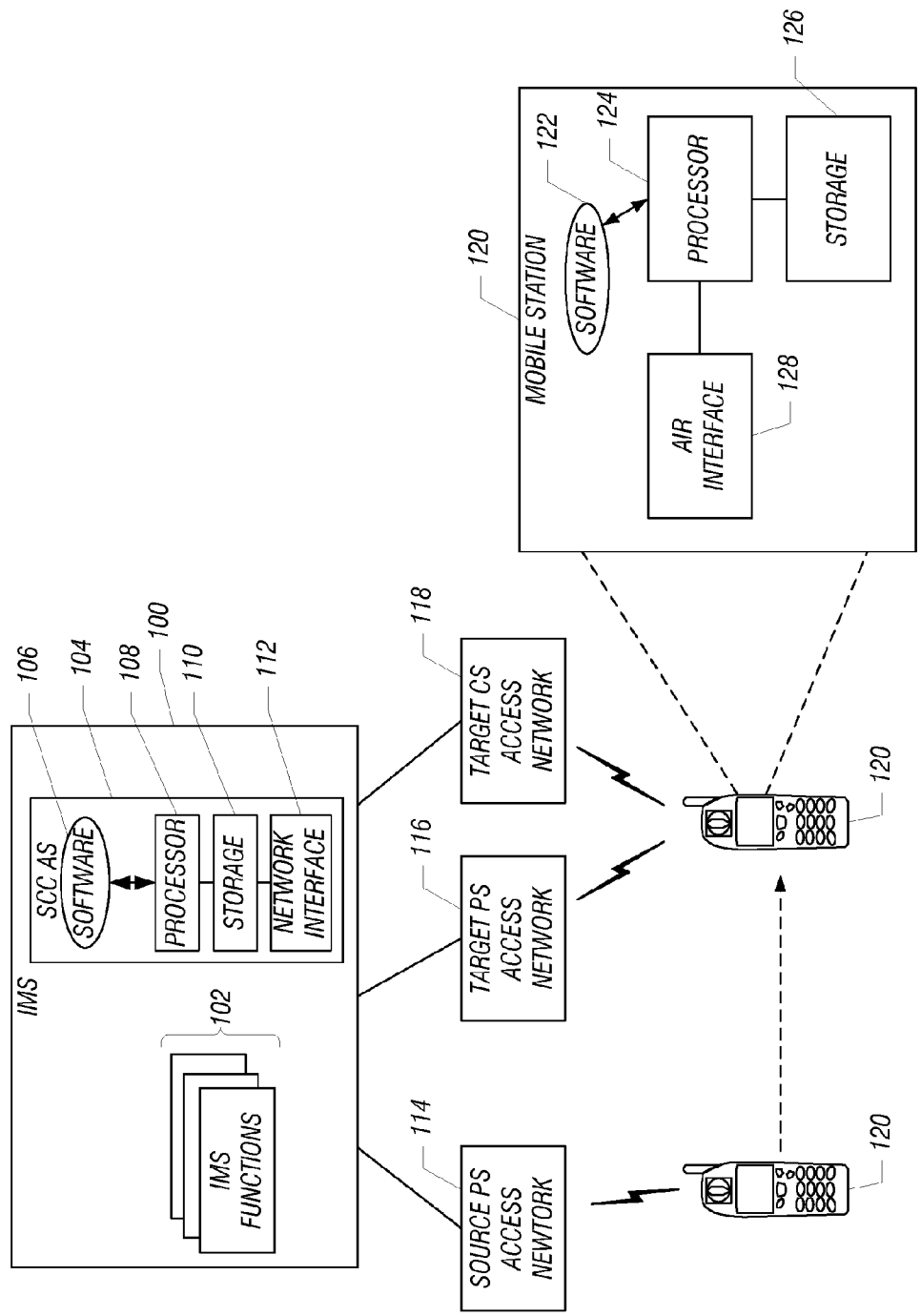
FIG. 1 is a block diagram of an exemplary communications network in which some preferred embodiments of the invention can be incorporated.

In the following description, numerous details are set forth to provide an understanding of some embodiments. However, it will be understood by those skilled in the art that some embodiments may be practiced without these details and that numerous variations or modifications from the described embodiments may be possible.

In accordance with preferred embodiments of the invention, an efficient mechanism is provided to perform a transfer of a multimedia session from a first packet-switched access network to different access network(s), where the different access network(s) include(s) a circuit-switched access network and possibly a second packet-switched access network. The multimedia session includes communication of real-time data (e.g., voice data) and possibly non-real time data (e.g., packet data associated with web browsing, e-mail, text chat, etc.). In some scenarios, the mobile station may be transferred to a network that supports real-time data only in the circuit-switched domain while non-real time data can be supported in the packet-switched domain. Examples of such networks include UTRAN (UMTS Terrestrial Access Network) and GERAN (GSM EDGE Radio Access Network). The mobile station may be initially attached to an access network that supports communication of both real-time and non-real time packet-switched data, such as the following networks: E-UTRAN, WiMax (Worldwide Interoperability for Microwave Access), WLAN (Wireless Local Area Network), and so forth.

Conventionally, when performing a transfer from a source packet-switched access network that supports both real-time data and non-real time data to a network in which multimedia data has to be split between both a packet-switched access network and a circuit-switched network, the message flow for performing such a transfer may involve different sets of messages for transferring to the different legs (a packet-switched access leg and a circuit-switched access leg). The use of multiple sets of messages may be inefficient.

In accordance with some preferred embodiments, for certain mobile stations, such as mobile stations that have ICS (IMS centralized services) capabilities, a more efficient and controlled mechanism can be used to perform access transfer of a multimedia session between a source packet-switched access network and a target network that includes a target packet-switched access network and a target circuit-switched access network. ICS is described in 3GPP TS 23.292. Among other capabilities, a mobile station that supports ICS is able to interact with an SCC AS (service centralized and continuity application server) for service control signaling. The SCC AS is an application server that is part of an IMS (Internet Protocol Multimedia Subsystem).

In accordance with preferred embodiments, the mobile station with ICS capabilities, upon detecting that the mobile station has to perform access transfer, sends a request that contains information indicating that the access transfer is to a target network that uses a circuit-switched domain for a first part of the multimedia session (e.g., real-time data communications) and a packet-switched domain for a second part of the multimedia session (e.g., non-real time data communications). Effectively, in response to such request, a first part of the multimedia session is transferred between a packet-switched and circuit-switched access networks, and a second part of the multimedia session is transferred between two packet-switched access networks. Such a transfer may be for a scenario in which the mobile station is active using a packet-switched access network in an IMS originating or terminating session with real-time data and zero or more non real time data.

FIG. 1 illustrates an exemplary network arrangement that includes an IMS system 100 that includes various IMS functions 102 and an SCC AS 104. Examples of IMS functions include a home subscriber server (HSS), which is a master database that contains subscription-related information (referred to as subscriber profiles). Another IMS function is a call session control function (CSCF), which is used to process call control signaling such as SIP (Session Initiation Protocol) call signaling. SIP is described in RFC (Request for Comments) 3261, entitled "SIP: Session Initiation Protocol," dated June 2002. SIP is an application-layer control signaling protocol for creating, modifying, and terminating multimedia sessions (any one or more of a voice session, audio session, video session, text chat session, or any combination of the foregoing).

There are various different types of CSCFs. An I-CSCF (interrogating call session control function) is the function that is able to determine an S-CSCF (serving call session control function) with which a user should register. The I-CSCF achieves this by querying the HSS to check that the user is allowed to register in the network. The S-CSCF is the function that registers a user and provides service to the user. The S-CSCF performs routing and translation, provides billing information, maintains session timers, and interrogates the HSS to retrieve authorization, user profiles, and so forth.

Other IMS functions include an MGCF (media gateway control function), which communicates with a CSCF and controls connections for media channels in a media gateway (MGW) for media conversions.

The SCC AS 104 implements access transfer functionality to transfer a session between access networks. The SCC AS 104 software 106 that is executable on a processor 108 to perform various tasks associated with the SCC AS 104. The SCC AS 104 also includes a storage 110 and a network interface 112 to perform communications. In the implementation of FIG. 1, the SCC AS 104 is a computing node. Note that in alternative implementations, other IMS functions can be provided with the SCC AS 104 on a common computing node.

FIG. 1 further shows various access networks, including a packet-switched access network 114, a packet-switched access network 116, and a circuit-switched access network 118. In this example, the 114 supports both packet-switched real-time data and non-real time data. On the other hand, the packet-switched access network 116 supports only packet-switched non-real time data, such that any real-time data associated with a session will have to be communicated over the circuit-switched access network 118.

In the example of FIG. 1, the packet-switched access network 114 is indicated as being a "source" packet-switched access network 114, since a mobile station 120 is initially attached to the packet-switched access network 114. As the mobile station 120 moves, the mobile station 120 (or an access network) may detect that the mobile station 120 is to be transferred to a target network that includes the "target" packet-switched access network 116 and "target" circuit-switched access network 120.

As noted above, the mobile station 120 has ICS capabilities, such that it can interact with the SCC AS 104 for service control signaling, including session transfer. The mobile station 120 is able to send a request, such as a SIP Invite request, that contains information indicating that a session of the mobiles station is to be transferred to both a target packet-switched access network and a target circuit-switched access network (e.g., 116 and 118 in FIG. 1). Such information in the Invite request can be in the form of an SDP (Session Description Protocol) section (media description part) in the Invite request that contains a description of the packet-switched media part and an indicator that circuit-switched access is to be used for real-time data. By using a single Invite request containing information pertaining to both circuit-switched access and packet-switched access for a multimedia session to be transferred, a more efficient and controlled message flow can be provided to perform the access transfer.

The mobile station 120 includes software 122 executable on a processor 124. The processor 124 is connected to a storage 126 and an air interface 128 to communicated wirelessly with an access network.

Figure 2:
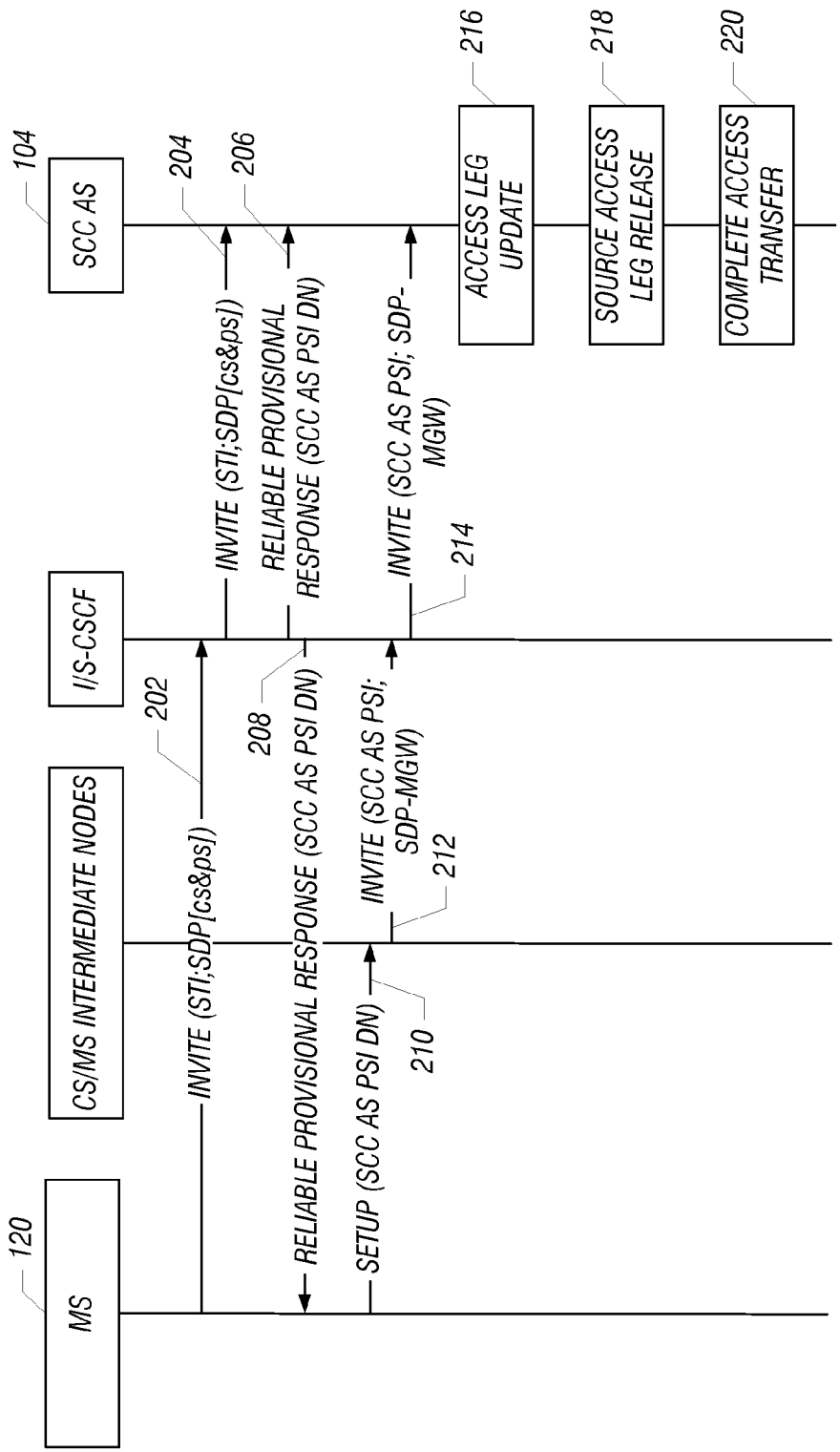
FIG. 2 is a message flow diagram of performing a transfer of a mobile station according to an embodiment.

An exemplary message flow diagram to perform an access transfer according to preferred embodiments is depicted in FIG. 2. This is an improvement on conventional flows in which separate un-related flows have to be used to perform the packet-switched to packet-switched transfer and the packet-switched to circuit-switched transfer.

The mobile station 120 is assumed to be initially attached to the source packet-switched access network 114 and is involved in a multimedia session that includes real-time data and zero or more non-real time data. When the mobile station determines a need for access transfer, the mobile station initiates registration with IMS system 100 via the target packet-switched access network 116 (if not already registered).

The mobile station then initiates an origination with circuit-switched media using the Gm reference point procedure as specified in 3GPP TS 23,292. This involves the setting up of a transparent service control signalling path between the mobile station and the SCC AS for control of the CS bearers. This is initiated by sending (at 202) a SIP Invite message containing a Session Transfer Identifier (STI) and an SDP section that includes a description of the packet-switched media information and information relating to the use of a circuit-switched bearer for the real-time media. The STI is an identifier of the session to transfer, and is used by the SCC AS 104 for performing the session transfer.

The Invite message originated by the mobile station is forwarded (at 204) by intermediate IMS nodes (e.g., S-CSCF) to the SCC AS 104. The SCC AS 104 identifies the session and media to be transferred using the STI and the SDP section, and continues the origination with circuit-switched media using the Gm reference point procedure. The SCC AS 104 completes the setup of the circuit-switched media part of the session by allocating an SCC AS PSI DN (public service identity directory number). The SCC AS PSI DN is described in 3GPP TS 23.292.

Next, the SCC AS 104 sends (at 206) a provisional response that contains the SCC AS PSI DN, which is forwarded (at 208) by the S-CSCF to the mobile station.

The mobile station then continues the origination with circuit-switched media using the Gm reference point procedure by sending (at 210) a Setup message including the SCC AS PSI DN to establish the circuit-switched media part of the session. As a result, the origination with circuit-switched media using Gm reference point procedure is used at intermediate circuit-switched and IMS nodes (including nodes in the circuit-switched access network 118 and the IMS system 100), which results in routing (at 212) of an Invite request to an I/S-CSCF. The Invite request is filled with the SCC AS PSI and SDP of the MGW (media gateway) as part of the origination with circuit-switched media using the Gm reference point procedure. The Invite request is forwarded (at 214) to the SCC AS 104.

The SCC AS 104 then performs an access leg update (at 216), which includes the SCC AS 104 using the SCC AS PSI to correlate the incoming session via the circuit-switched access network with the access transfer request previously received via the packet-switched access network. The SCC AS 104 completes the establishment of the access leg by combining the description of the circuit-switched portion of the session with the description of the packet-switched portion of the session. The SCC AS 104 then performs the access transfer by updating the remote leg with the media description and other information of the newly established access leg using an access leg update procedure as specified in 3GPP TS 23.237.

If the mobile station transfers all the media to the target packet-switched access network, then the source access leg established over the source packet-switched access network is released (at 218). However, if the mobile station chooses to retain some media in the source packet-switched access network the mobile station sends an Invite request to the SCC AS (as part of an existing dialog) containing information related to the retained media. The SCC AS updates the session information sent over the source access leg by performing an access leg update. Additionally, the SCC AS completes the access transfer procedure (at 220) by updating the remote leg (if necessary). The source access leg is not released in this case.

FIG. 2 shows a PS-PS in conjunction with a PS-CS transfer. Alternatively, a transfer in the reverse direction is possible, which involves a PS-PS transfer in conjunction with a CS-PS transfer.

The tasks discussed above can be performed by software executable in various computing nodes. Instructions of such software (e.g., software 106 and 122) are loaded for execution on a processor (e.g. 108 and 122 in FIG. 1). The processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method performed by a processor, comprising:
   receiving a first request originated by a mobile station, wherein the first request contains information relating to both packet-switched communication and circuit-switched communication of data in a session, wherein the first request is originated by the mobile station in response to detecting that a transfer is to be performed from a source packet-switched access network to a target network in which different parts of the session is to be communicated in the packet-switched domain and circuit-switched domain;
   completing the transfer using the information in the first request;
   in response to the first request, sending a response that contains a public service identity that enables generation of a second request that contains a media description part that refers to a media gateway to be used for the circuit-switched communication;
   receiving the second request; and
   combining the media description part of the second request relating to the circuit-switched communication with a media description part of the first request relating to the packet-switched communication.

2. The method of claim 1, wherein receiving the first request comprises receiving a Session Initiation Protocol (SIP) Invite request that contains a media description part that includes information relating to both packet-switched media and circuit-switched media.

3. The method of claim 1, wherein the receiving and completing is performed by a Service Centralization and Continuity Application Server (SCC AS).

4. The method of claim 1, further comprising updating an access leg including both packet-switched and circuit-switched communications using the combined media description parts.

5. The method of claim 1, wherein receiving the request comprises receiving the request that initiates an origination with circuit-switched media using the Gm reference point procedure.

6. A node comprising:
   a network interface; and
   a processor to:
      receive a first request originated by a mobile station, wherein the first request contains information relating to both packet-switched communication and circuit-switched communication of data in a session, wherein the first request is originated by the mobile station in response to detecting that a transfer is to be performed from a source packet-switched access network to a target network in which different parts of the session is to be communicated in the packet-switched domain and circuit-switched domain;

complete the transfer using the information in the first request in response to the first request, sending a response that contains a public service identity that enables generation of a second request that contains a media description part that refers to a media gateway to be used for the circuit-switched communication;

receiving the second request; and combining the media description part of the second request relating to the circuit-switched communication with a media description part of the first request relating to the packet-switched communication.

7. The node of claim 6, comprising a Service Centralization and Continuity Application Server (SCC AS).

8. The node of claim 6, wherein the first request comprises a Session Initiation Protocol (SIP) Invite request that contains a media description part that includes information relating to both packet-switched media and circuit-switched media.

\* \* \* \* \*